(12) United States Patent
Watanabe

(10) Patent No.: US 7,238,930 B2
(45) Date of Patent: Jul. 3, 2007

(54) INSPECTION DEVICE FOR MOUTH OF CONTAINER

(75) Inventor: Tsukasa Watanabe, Nishinomiya (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 10/542,098

(22) PCT Filed: Jan. 21, 2004

(86) PCT No.: PCT/JP2004/000509

§ 371 (c)(1),
(2), (4) Date: Jul. 13, 2005

(87) PCT Pub. No.: WO2004/065903

PCT Pub. Date: Aug. 5, 2004

(65) Prior Publication Data

US 2006/0140470 A1   Jun. 29, 2006

(30) Foreign Application Priority Data

Jan. 24, 2003   (JP) ............................. 2003-016272

(51) Int. Cl.
*B07C 5/12* (2006.01)
*B07C 5/34* (2006.01)
*G01N 21/90* (2006.01)
*G01N 9/04* (2006.01)
*G01N 7/00* (2006.01)
*G01N 40/14* (2006.01)

(52) U.S. Cl. ................................ 250/223 B; 356/239.4
(58) Field of Classification Search ............ 250/223 B; 356/239.4
See application file for complete search history.

(56) References Cited

U.S. PATENT DOCUMENTS

| 4,551,627 A | * | 11/1985 | Reich ..................... 250/339.12 |
| 4,580,045 A | | 4/1986 | Kulig |
| 4,682,023 A | * | 7/1987 | Yoshida .................. 250/223 B |
| 5,461,228 A | * | 10/1995 | Kirkman et al. ........ 250/223 B |

* cited by examiner

*Primary Examiner*—Georgia Epps
*Assistant Examiner*—Patrick J. Lee
(74) *Attorney, Agent, or Firm*—Rabin & Berdo PC

(57) ABSTRACT

A container mouth inspection device which can produce an ideal optical image that reliably provides information on the inner contour of the container mouth, and which enables accurate and speedy measurement of the inside diameter or the like of the container mouth. The container mouth inspection device includes a light source (2) for emitting diffused light to the bottom (99b) of the container (99) having a mouth (99a), and an optical system (1) in which a lens (10) and a diaphragm (11) are arranged along an optical axis (5) extending through the center of the mouth (99a) of the container (99) such that the diaphragm (11) is positioned behind the lens (10). The diaphragm (11) is offset backward from a back focus of the lens (10) along the optical axis (5) by a predetermined distance d so as to form an optical image of the mouth (99a) in a position behind the diaphragm (11).

6 Claims, 11 Drawing Sheets

INSPECTION DEVICE FOR MOUTH OF CONTAINER

TECHNICAL FIELD

The present invention relates to an optical, non-contact container mouth inspection device for inspecting the inside diameter, inner contour, or the like of the mouth of containers such as glass bottles, PET bottles, and the like.

BACKGROUND ART

In an inspection process in the production of containers having a mouth, the outside diameter, inside diameter, and slope and the like of the top surface of the mouth are examined. A conventional method adopted in this mouth inspection process uses a closure member having a predetermined diameter, which is inserted into the mouth to inspect the mouth inside diameter. With this inspection method, if the closure member can be inserted into the mouth, the container is determined to be "good," whereas, if the closure member cannot be inserted into the mouth, the container is determined to be "defective."

However, such an inspection method in which a closure member is contacted with the inner surface of the mouth is not welcome particularly for containers for holding food or beverage, and the trend is toward non-contact inspection methods, for example, using optical devices.

FIG. 10 illustrates a common inspection device using an optical device. In the drawing, 101 denotes a light source for generating diffused light. Part of the light from the light source 101 is projected to the bottom 99b of the container 99 through a circular aperture 103 in a diaphragm plate 102. The optical axis 104 extends through the center of the mouth 99a of the container 99, and the optical device 100 is arranged on the optical axis 104 above the container 99. The optical device 100 includes an optical system 105 having a plurality of integrally mounted lenses with a diaphragm disposed between the lenses to form an optical image 107 of the mouth 99a on an image surface 106. The solid lines in the drawing reaching the image surface 106 indicate the paths of light forming a bright part of the optical image 107. The dotted lines are paths of imaginary light corresponding to a dark part in the image and there are no actual light rays along these lines.

The optical image 107 includes, as shown in FIG. 11, a circular bright part 108 in the center formed by light that has passed through the opening of the mouth, and an annular dark part 109 formed around the bright part indicating the top surface 99d of the mouth. Between the circular bright part 108 and the annular dark part 109 are formed a plurality of annular bright parts 110 formed by light reflected by the inner surface of the mouth 99a (denoted at $L_p$ in FIG. 10). Accordingly, this optical image 107 does not provide any accurate information regarding the shape of the top surface 99d or the opening 99c of the mouth, nor does it give any information on the inner contour of the part P where the inner surface protrudes most, i.e., inspection of the mouth interior is hardly possible with an inspection device of the design shown in FIG. 10.

Compared to this, an optical inspection device disclosed before in Japanese Published Unexamined Patent Application No. Hei 8-54213 can form an optical image that provides information on the inner contour of a container mouth; its optical device uses a telecentric optical system 111 shown in FIG. 12.

In FIG. 12, 2 denotes a light source for generating diffused light, which emits light to the bottom 99b of the container 99. The amount of light from the light source 2 is controlled by a circular aperture 4 in a diaphragm plate 3. An optical device 6 including the telecentric optical system 111 is arranged on the optical axis 5 extending through the center of the mouth 99a of the container 99, and an optical image of the mouth 99a of the container 99 is formed on an image surface 7 consisting of a CCD. The optical image is input to an image processing device 8 in which the image of the mouth 99a is processed for the measurement of the inside diameter. A display 9 in the drawing is for displaying the optical image and input or output data, and the like.

The telecentric optical system 111 is made up of an assembly of lenses 10 that can be focused (hereinafter referred to simply as "lens") and a diaphragm 11 arranged on the optical axis 5 such that an aperture 11a in the diaphragm 11 is positioned at the focus F of the lens 10. With this optical system 111, as shown in FIG. 13, only the light rays that are parallel to the optical axis 5 are passed through the aperture 11a in the diaphragm 11 and collected on the image surface 7, after passing through and being refracted by the lens 10. The light rays that are not parallel to the optical axis 5, for example, the light rays reflected by the inner surface of the mouth 99a or the like, also pass through and are refracted by the lens 10. However, the thus refracted light rays are shut off so that they do not enter the aperture 11a in the diaphragm 11.

In FIG. 13, the paths of light forming a bright part of the optical image 12 are indicated by the solid lines, while the paths of imaginary light corresponding to a dark part are indicated by dotted lines (there are no actual light rays along these lines).

The lens 10 is set such that the most protruding part P in the inner surface of the mouth 99a is in focus, and thus the optical system 111 can form an optical image 12 that provides information on the inner contour of the mouth 99a of the container 99, in particular, of the most protruding part P in the inner surface of the mouth 99a.

This optical image 12 includes, as shown in FIG. 14, a circular bright part 13 in the center formed by light that has passed through the opening of the mouth, and a first annular dark part 14 therearound that appears because part of light is shut off by the most protruding part P of the mouth 99a, and a second annular dark part 15 formed therearound indicating the top surface 99d of the mouth.

This optical image 12 is input to the image processing device 8, in which its gray scale image is converted into a binary image to calculate out a largest inscribed circle 16 of the first dark part 14. The diameter of this largest inscribed circle 16 corresponds to the inside diameter (effective diameter) of the mouth 99a. Thus, if the measured inside diameter r is out of a predetermined range, i.e., if r>R1 or r<R2, where R1 and R2 are the upper limit and the lower limit of the inside diameter of the mouth 99a, respectively, the container is determined as defective.

The principal rays parallel to the optical axis 5 for forming the optical image 12 actually include, as shown in FIG. 15, components of light directed at a maximum angle of α (indicated by dash-dot lines in the drawing) in the outer directions around the principal rays L (indicated by solid lines). This results from the diameter of the aperture 11a in the diaphragm 11 being set large enough to achieve an amount of light necessary for the measurement. A, B, and C in the drawing denote the points on the container 99 in focus, i.e., they represent the points in the vicinity of the most protruding part P in the inner surface of the mouth 99a.

Of the light rays reflected by the vicinities of the most protruding part P in the inner surface of the mouth 99a, particularly those (indicated by $L_p$ in FIG. 13) that overlap the components of light L' directed inwardly relative to the principal rays L cause formation of a shadow 18 (see FIG. 14) along the inner edge of the first dark part 14 in the optical image 12.

This shadow 18 has an intermediate brightness, and when this appears in the optical image 12, it makes the inner edge of the first dark part 14 indistinct, which can cause erroneous measurement results of the diameter of the largest inscribed circle 16. Another problem is that the binary threshold level is hard to select when binarizing the gray scale image of the optical image 12 in the image processing device.

A possible solution to the problem is, using the diaphragm plate 3, to restrict the paths of the light rays $L_p$ reflected by the vicinities of the most protruding part P in the inner surface of the mouth 99a of the container 99 to reduce the amount of light that overlaps the light components L'. This method, however, is not preferable because the influence of light refraction at the bottom 99b of the container 99 will be too large.

The reason for using the diffusion light source 2 is to compensate for the principal rays parallel to the optical axis 5 that are lost by light refraction at the bottom 99b of the container 99 because of the shape, uneven thickness, or an incised mold number or the like of the bottom, by refraction of other angles of light. If the aperture 4 of the diaphragm plate 3 is made smaller to restrict the paths of the reflected light $L_p$, the principal rays that are lost by the light refraction at the bottom 99b caused by its shape or the like cannot be compensated for by refraction of other angles of light, as a result of which an image of the container bottom 99b will appear in the optical image 12.

To avoid this problem, the diameter of the aperture 4 in the diaphragm plate 3 needs to be set substantially large relative to the inside diameter of the mouth 99a of the container 99 in order to enable the compensation of the principal rays parallel to the optical axis 5 that are lost by the light refraction at the bottom 99b of the container 99 caused by its shape or the like by refraction of other angles of light. If the difference between the inside diameter of the mouth and that of the bottom of the container is small, the container cannot be placed on the diaphragm plate 3 when inspected, because the diameter of the aperture 4 in the diaphragm plate 3 will have to be larger than the bottom diameter in order to compensate for the lost principal rays by refraction of other angles of light. Since the diaphragm plate 3 is used also for supporting the container, the container must be suspended during inspection if it cannot be placed on the diaphragm plate 3. On the other hand, if the diameter of the aperture 4 in the diaphragm plate 3 is made small so that the container can be placed on the diaphragm plate 3 during inspection, then the lost principal rays parallel to the optical axis 5 cannot be compensated for sufficiently by refraction of other angles of light, as described above.

The present invention was devised based on the foregoing problems, its object being to provide a container mouth inspection device which can produce an ideal optical image that reliably provides information on the inner contour of the container mouth, and which enables accurate and speedy measurement of the inside diameter or the like of the container mouth.

DISCLOSURE OF THE INVENTION

A container mouth inspection device according to this invention includes a light source for emitting diffused light to a bottom of a container having a mouth, and an optical system in which a lens and a diaphragm are arranged along an optical axis extending through the center of the container mouth. In this invention, the diaphragm is offset backward from a back focus of the lens along the optical axis by a predetermined distance so as to form an optical image of the mouth in a position behind the diaphragm.

In the above-described structure of the invention, the "lens" should be understood as including a lens assembly of a plurality of lenses. A "back focus of the lens" can be positioned in back or in front of the rearmost lens of the lens assembly. The "diaphragm," too, can be positioned in back or in front of the rearmost lens of the lens assembly.

With this structure, the optical image of the mouth includes a circular bright part formed by light passed through the opening of the mouth, and an annular dark part (first dark part) around the bright part, which appears because part of the light is shut off by a most protruding part in the inner surface of the mouth. This first dark part provides information on the inner contour of the container mouth.

When the diaphragm is positioned at the focus of the lens, a shadow appears along the inner edge of the first dark part, which is caused by the light reflected by the vicinities of the most protruding part in the inner surface of the mouth. However, when the diaphragm is offset backward from a back focus of the lens along the optical axis by a predetermined distance, the principal rays are inclined outwardly relative to the optical axis. As a result, the light reflected by the inner surface of the mouth does not overlap the components of light around the principal rays and does not pass through the aperture in the diaphragm, and therefore the shadow does not appear in the optical image.

According to this invention, therefore, an ideal optical image that reliably provides information on the inner contour of the container mouth can be obtained, and accurate and speedy measurement of the inside diameter or the like of the mouth is possible.

Since the principal rays are converged on the side of the container bottom relative to the mouth, the principal rays that are lost by light refraction at the container bottom caused by its shape or the like can be compensated for by refraction of other angles of light. Therefore, even if the light source is a small one, no image of the container bottom will appear in the optical image.

In addition to the above-described structure, the container mouth inspection device of this invention may further include an image processing device for performing image processing of the input optical image for measurement of the inside diameter of the mouth.

In a preferred embodiment of this invention, the lens is arranged such that the most protruding position in the inner surface of the mouth is in focus. Here, "the most protruding position in the inner surface of the mouth," in other words, is the part where the inside diameter of the mouth is smallest, including a locally narrowed part and a narrowed part extending a certain length.

In a preferred embodiment of this invention, the diaphragm is movable along the optical axis for position adjustment, so that it can be used for various types of containers.

BEST MODE FOR CARRYING OUT THE INVENTION

Figure 1:
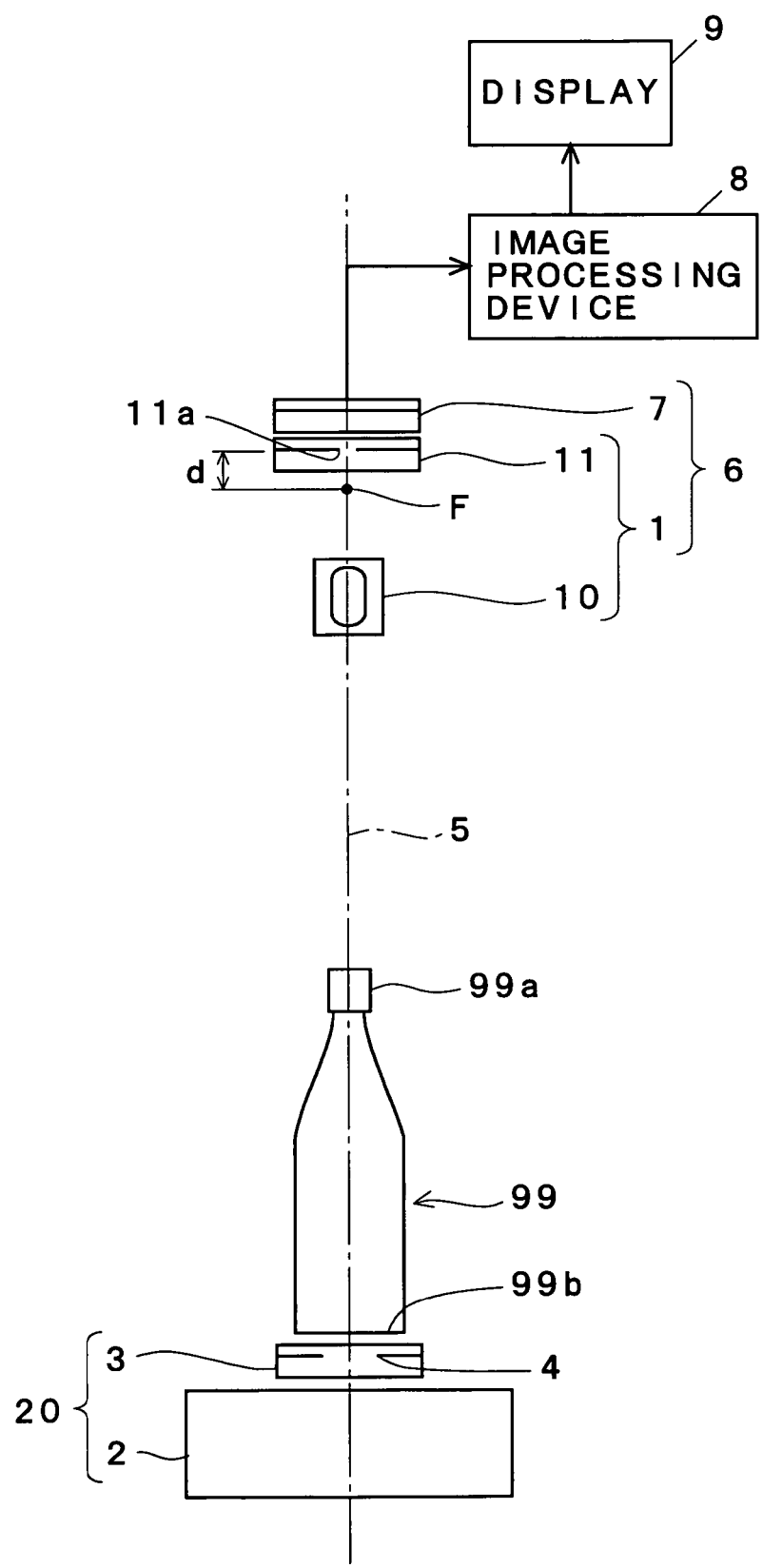
FIG. 1 is a front view illustrating the structure of one embodiment of a container mouth inspection device of the present invention.

FIG. 1 shows the structure of one embodiment of a container mouth inspection device of the present invention.

The illustrated mouth inspection device is made up of a light projection device 20, an optical device 6, and an image processing device 8 having a display 9. The light projection device 20 includes a light source 2 for generating diffused light and a diaphragm plate 3 having a circular aperture 4 in the center thereof. The amount of light from the light source 2 is controlled by the aperture 4 on the diaphragm plate 3 and the controlled light is projected to the bottom 99b of the container 99.

The container 99 to be inspected is located at an inspection position directly above the light projection device 20. The container 99 is brought in onto and taken out of the inspection position by a carry-in/out device (not shown).

The optical device 6 includes an optical system 1 arranged on the optical axis 5 extending through the center of the mouth 99a of the container 99, and an image surface 7 on which an optical image of the mouth 99a of the container 99 is formed by this optical system 1. The image surface 7 is formed by a CCD. The optical image formed on this image surface 7 is input to an image processing device 8 in which the image of the mouth 99a is processed for the measurement of the inside diameter.

Figure 2:
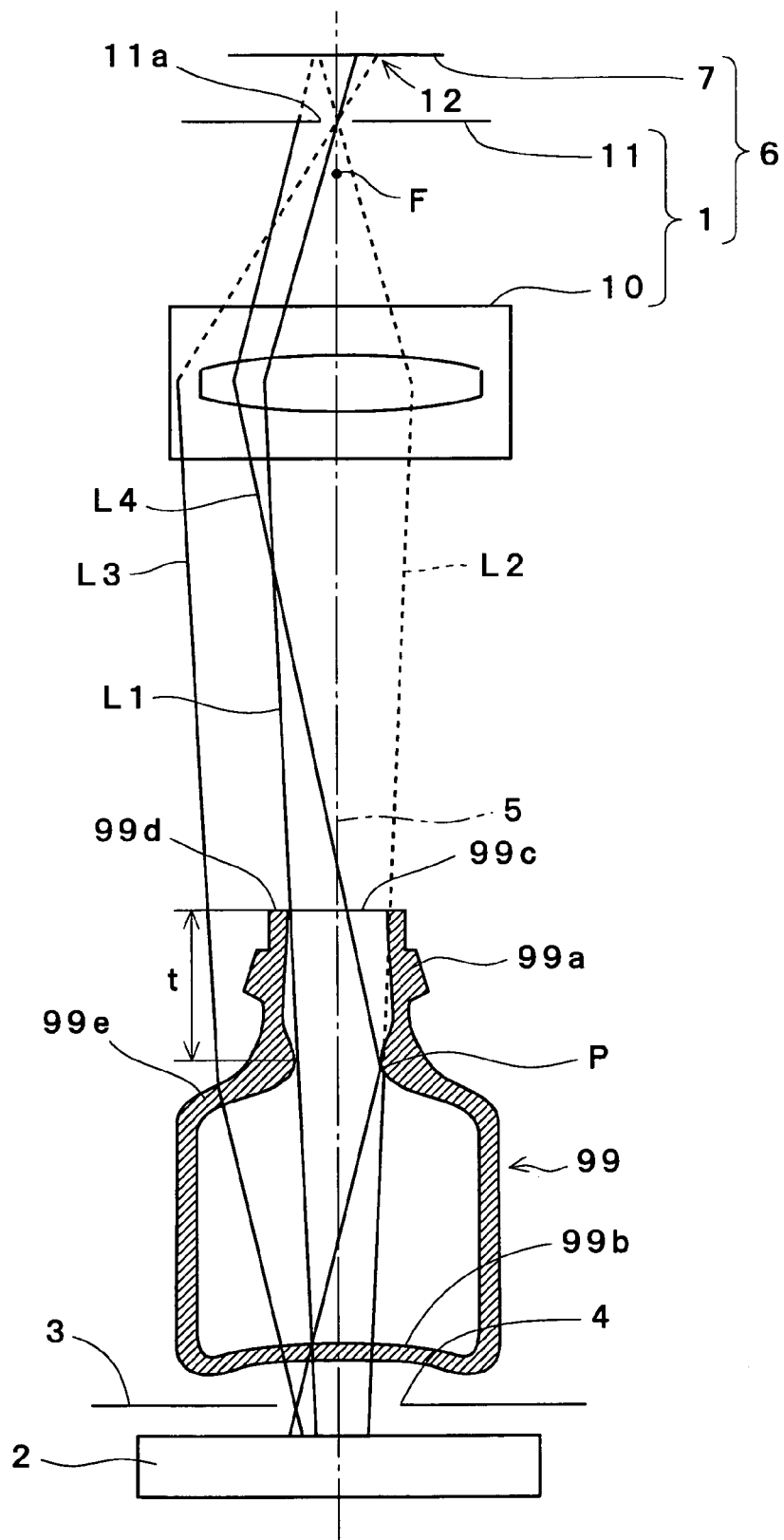
FIG. 2 is a diagram illustrating the structure of the optical device and light paths.

The optical system 1 includes a lens 10 arranged on the optical axis 5 and a diaphragm 11 positioned behind the lens 10. The lens 10 is an assembly of lenses that can be focused. The lens 10 is set such that, as shown in FIG. 2, the point inward of the opening 99c by a certain distance t (e.g., 15 mm) of the mouth 99a of the container 99, i.e., the most protruding part P in the inner surface of the mouth 99a, is in focus. The most protruding part P in the inner surface of the mouth 99a is not limited to the illustrated position, and it may be, for example, at the opening 99c of the mouth 99a. In that case, the lens 10 is arranged such that the vicinity of the opening 99c is in focus.

The diaphragm 11 has an aperture 11a in the center. The aperture size is varied in accordance with the diaphragm value to regulate the amount of light projected to the image surface 7. The diaphragm value is set appropriately to secure sufficient light necessary for the measurement with a certain focus depth.

While the diaphragm 11 is fixed in a predetermined position in this embodiment, it may be structured movable, either electrically or manually, along the optical axis 5.

Figure 3:
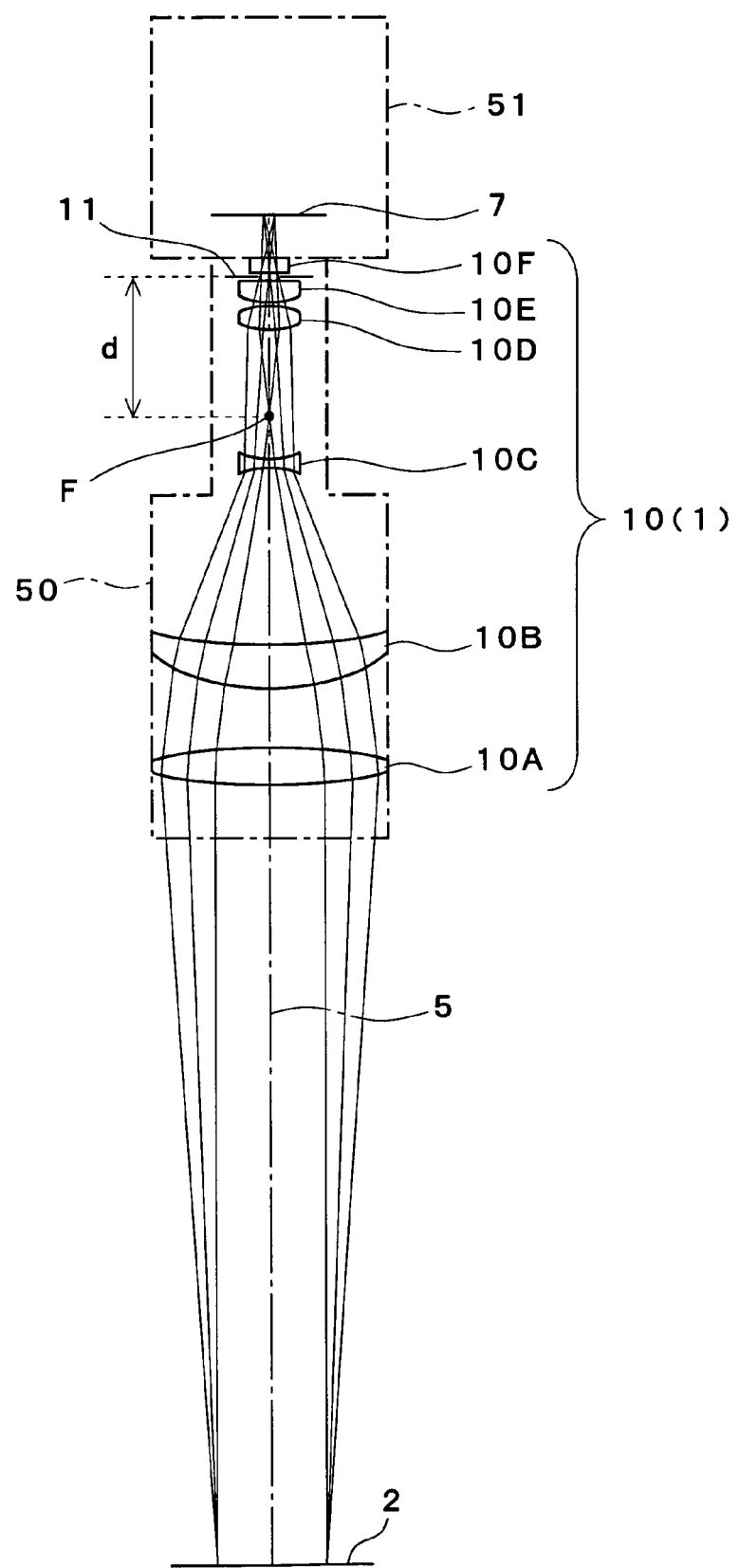
FIG. 3 is a diagram illustrating the structure of the optical device and light paths in another embodiment of the present invention.

Also, while the diaphragm 11 is located behind the lens 10 in this embodiment because the back focus F of the lens 10 is positioned outside the lens 10, the structure shown in FIG. 3 may also be employed in order to improve aberration and resolution. In the optical system 1 of the embodiment shown in FIG. 3, the back focus F of the lens 10 is positioned inside the lens 10, and so is the diaphragm 11. In the illustrated example, the lens 10 is an assembly of six lenses 10A to 10F; the focus F is positioned between the lenses 10C and 10D, and the diaphragm 11 is arranged in the middle between the lenses 10E and 10F. In the drawing, 50 denotes the lens assembly having the six lenses 10A to 10F and the diaphragm 11 integrally assembled, and 51 denotes a camera body having the image surface 7 consisting of a CCD. The lens assembly 50 is detachably mounted in the camera body 51. The plurality of solid lines drawn between the light source 2 and the image surface 7 in FIG. 3 represent the paths of light passing through the aperture in the diaphragm 11.

Figure 12:
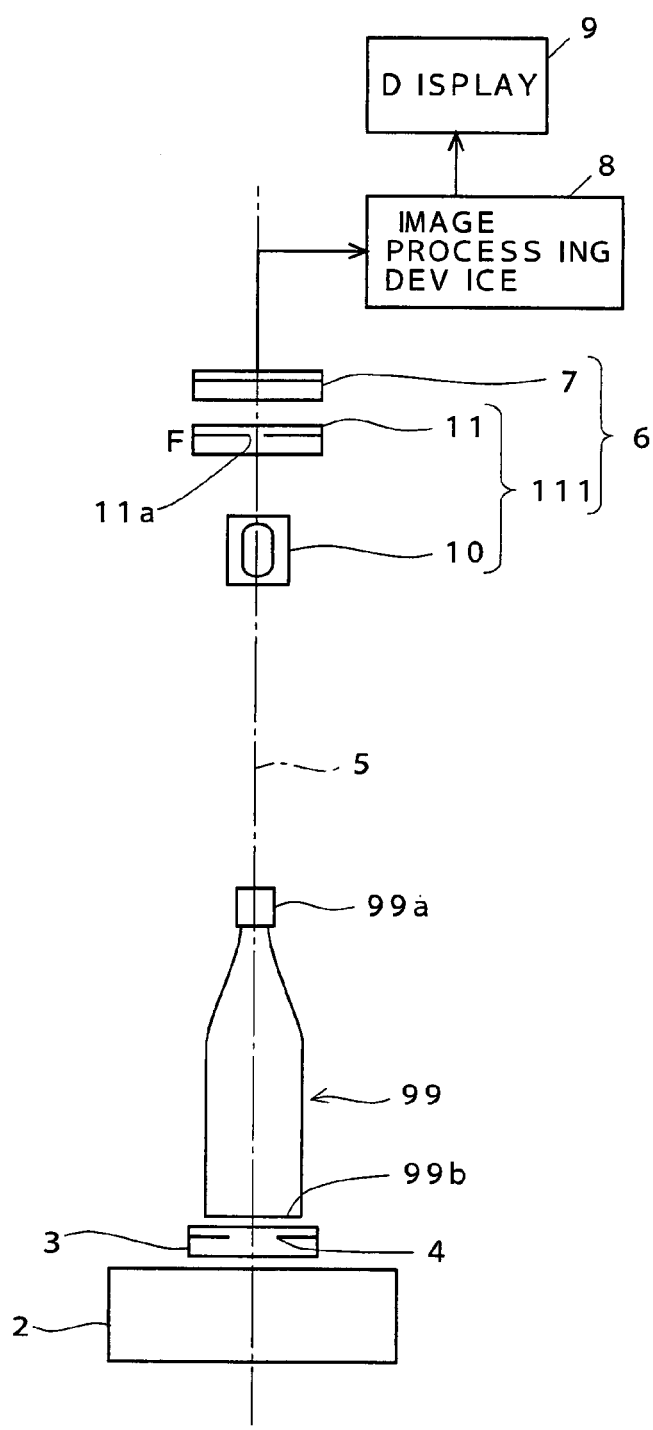
FIG. 12 is a front view illustrating the structure of an optical inspection device using a telecentric optical system.

In the telecentric optical system 111 (shown in FIG. 12) wherein the aperture 11a of the diaphragm 11 is positioned at the focus F of the lens 10, only the light rays parallel to the optical axis 5 are passed through the aperture 11a of the diaphragm 11 and collected on the image surface 7, while the light rays that are not parallel to the optical axis 5 are not passed through the aperture 11a of the diaphragm 11 and shut off at the diaphragm 11.

Compared to this, in the optical system 1 according to the invention, the diaphragm 11 is offset backward from the back focus F of the lens 10 (in a direction away from the lens 10) along the optical axis 5 by a predetermined distance d, so that the principal rays L1 to L3 are inclined outward (in a direction away from the optical axis 5). As a result, the light reflected by the most protruding part P in the inner surface of the mouth 99a, which would pass through the aperture 11a of the diaphragm 11 if the diaphragm 11 was positioned at the focus F of the lens 10, does not pass through the aperture 11a of the diaphragm 11 and is shut off at the diaphragm 11.

Referring now back to FIG. 1 and FIG. 2, the operation of the optical system 1 according to the invention is described in detail below.

The light paths when the diaphragm 11 is positioned behind the back focus F are as illustrated in FIG. 2. In the drawing, the solid lines indicate the paths of light forming a bright part in the optical image 12 on the image surface 7, and the dotted lines indicate the paths of imaginary light corresponding to a dark part (there are no actual light rays along these lines).

Of the three principal rays L1 to L3 inclined relative to the optical axis 5, the principal ray L1 has passed through the opening of the mouth 99a of the container 99; its path reaches the image surface 7 via the aperture 11a of the diaphragm 11. The principal ray L2 hits the most protruding part P in the inner surface of the mouth 99a, and its imaginary light path goes through the aperture 11a of the diaphragm 11 and reaches the image surface 7. The principal ray L3 has transmitted through the shoulder 99e of the container 99 and reached a point outside the lens 10; its imaginary light path goes through the aperture 11a of the diaphragm 11 and reaches the image surface 7.

The light ray L4 is the light that hits the most protruding part P in the inner surface of the mouth 99a and is reflected; it passes through the lens 10, and is shut off at the diaphragm 11, not passing through the aperture 11a of the diaphragm 11.

Figure 13:
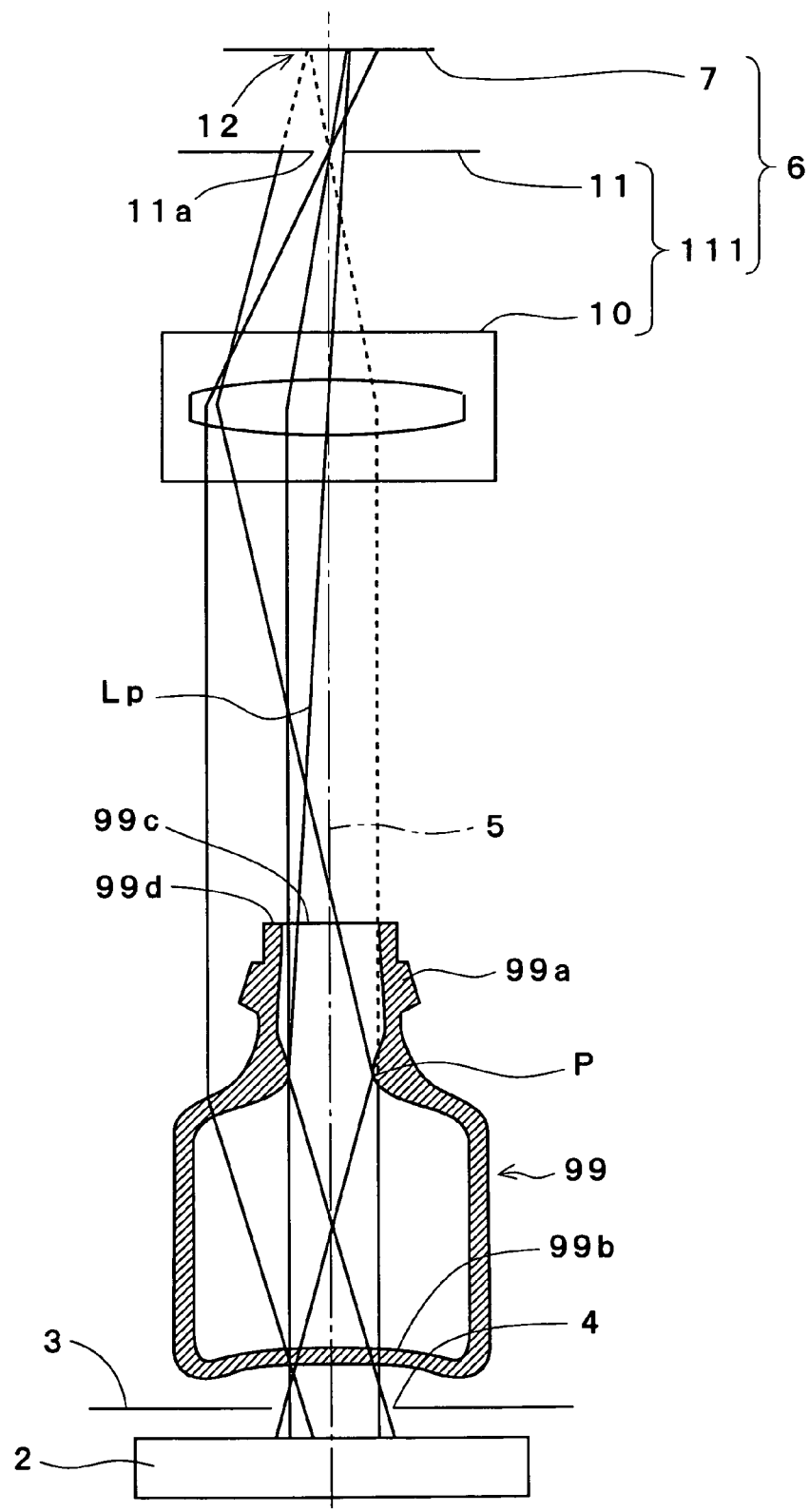
FIG. 13 is a diagram illustrating the structure of the optical device of FIG. 12 and light paths.
Figure 14:
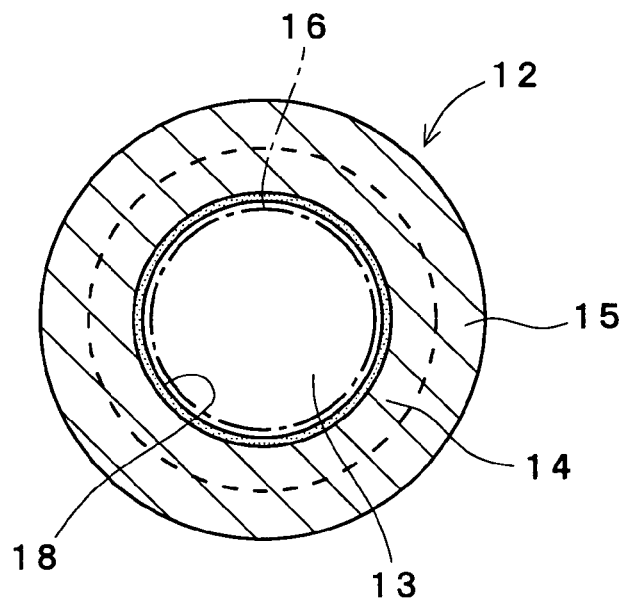
FIG. 14 is a diagram illustrating an optical image obtained by the optical device of FIG. 12.
Figure 15:
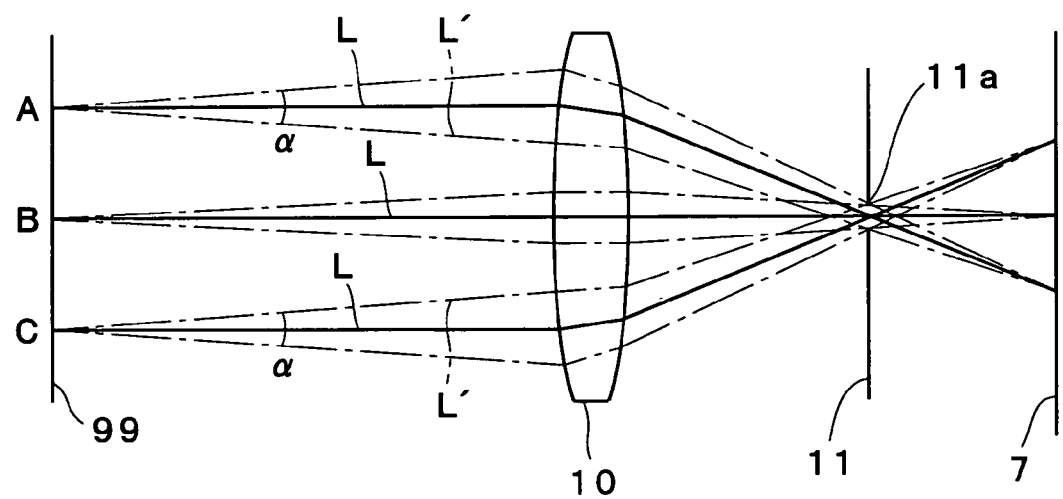
FIG. 15 is a diagram illustrating the principal rays and other light components in the optical device of FIG. 12.

In the telecentric optical system 111 shown in FIG. 13, the principal rays parallel to the optical axis 5 for forming the optical image 12 include, as shown in FIG. 15, components of light directed at a maximum angle of α (indicated by dash-dot lines in the drawing) around the principal rays L (indicated by solid lines).

Figure 4:
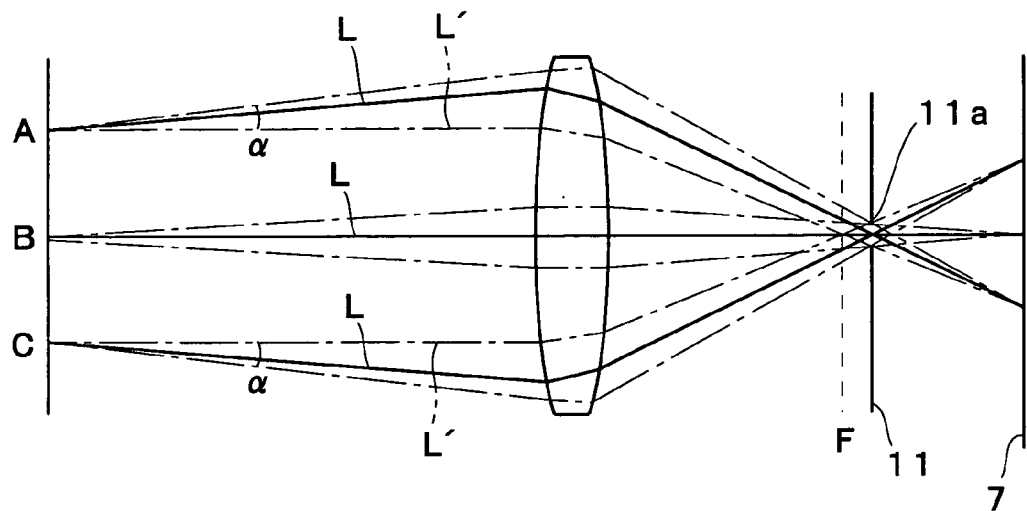
FIG. 4 is a diagram illustrating principal rays and other light components.

Compared to this, in the optical system 1 according to the invention, because the diaphragm 11 is offset backward from the focus F (away from the lens 10) along the optical axis 5 so that the principal rays L are inclined away from the optical axis 5. Accordingly, as shown in FIG. 4, the components of light that are inclined at a maximum angle of α (indicated by dash-dot lines) around the principal rays L are inclined similarly to the principal rays L.

That is, in the telecentric optical system 111 wherein the diaphragm 11 is positioned at the focus F of the lens 10, the light reflected by the most protruding part P in the inner surface of the mouth 99a overlaps the light components L' that are inclined inwardly relative to the principal rays L when passing through the aperture 11a of the diaphragm 11. Compared to this, in the embodiment shown in FIG. 4, the principal rays L are inclined so that the innermost light components L' are parallel to the optical axis 5. Thereby, the light reflected by the part P does not pass through the aperture 11a of the diaphragm 11 and is shut off at the diaphragm 11.

The inclination angle of the principal rays L relative to the optical axis 5 need not necessarily be set such that the light components L' will be parallel to the optical axis 5, as long as a proper binary image of the optical image 12 is obtained (to be described in detail later). If, for example, about one third of the light components inclined at a maximum angle α around the principal rays L are inside of the light paths parallel to the optical axis 5, a proper binary image of the optical image 12 can be obtained by inclining the principal rays relative to the optical axis 5.

Figure 5:
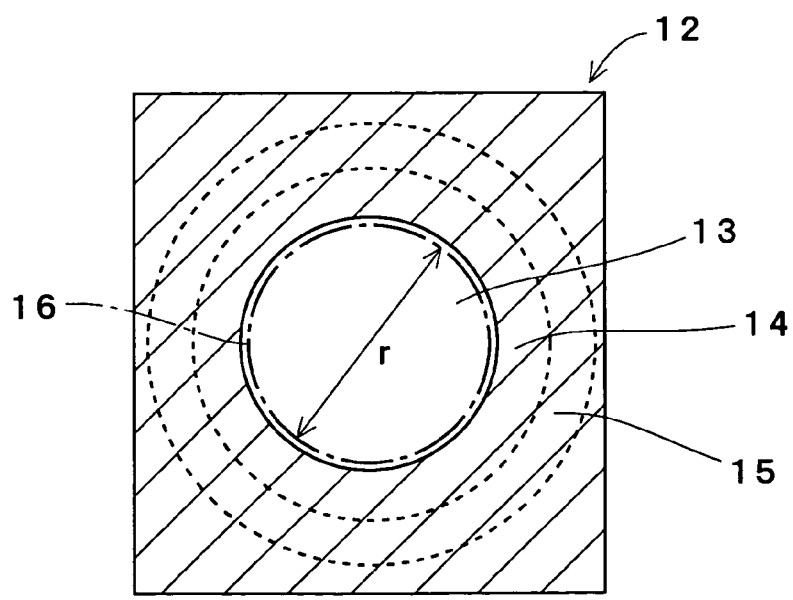
FIG. 5 is a diagram illustrating an optical image of a good product.
Figure 6:
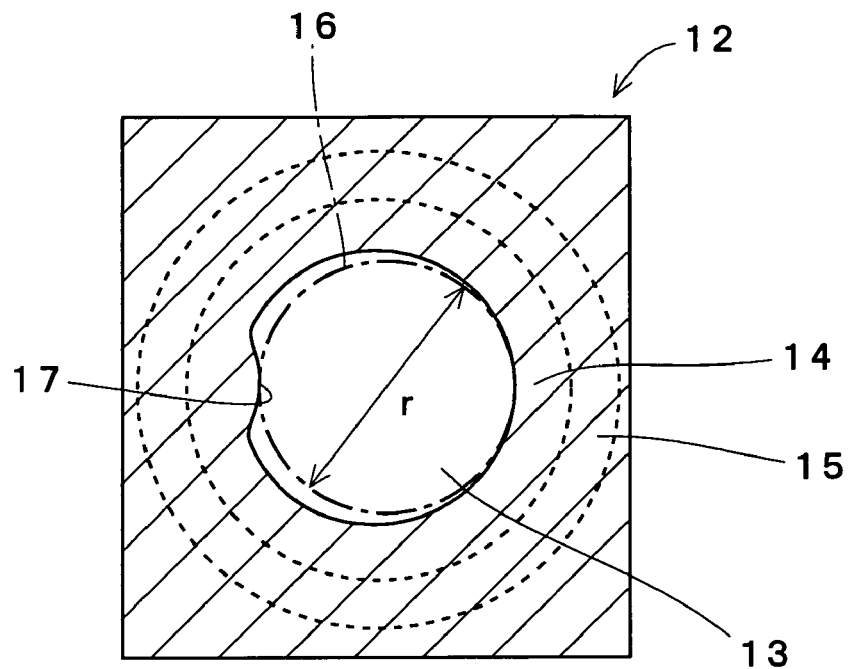
FIG. 6 is a diagram illustrating an optical image of a defective product.

FIG. 5 and FIG. 6 illustrate an optical image 12 formed on the image surface 7. The optical image 12 includes a circular bright part 13 in the center formed by light passed through the opening of the mouth, a first annular dark part 14 thereround that appears because part of light is shut off at the most protruding part P in the inner surface of the mouth 99a, and a second annular dark part 15 formed therearound indicating the top surface 99d of the mouth. The second dark part 15 is merged in the first dark part 14, and no shadow is formed along the inner edge of the first dark part 14 which is caused by light reflection at the inner surface of the mouth 99a.

FIG. 5 illustrates an optical image 12 of a "good" product, whereas FIG. 6 illustrates an optical image 12 of a "defective" product that has a burr on the most protruding part P in the inner surface of the mouth. In FIG. 5, 17 represents the image of the burr.

With the telecentric optical system 111 shown in FIG. 13, because the principal rays are parallel to the optical axis 5, the light components inclined inwardly relative to the principal rays are shut off by the inner surface of the mouth 99a, as a result of which the light amount is reduced and an optical image with a sharp edge cannot be obtained. Compared to this, with the optical system 1 according to the invention, because the principal rays are inclined outwardly relative to the optical axis 5, the light components inclined inwardly relative to the principal rays are not shut off by the inner surface of the mouth even if the most protruding part P extends a substantial length, whereby the edge of the first dark part 14 is clear in the obtained optical image 12.

Figure 7:
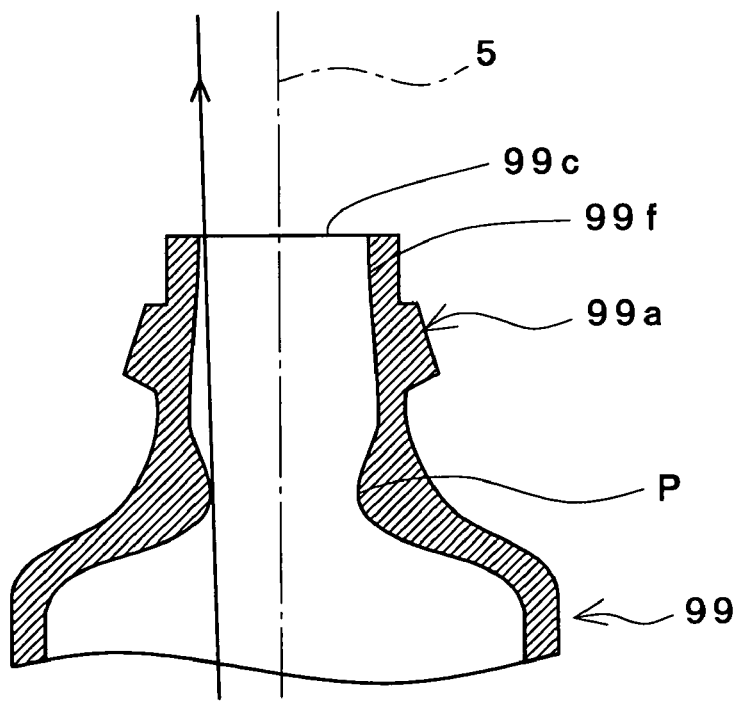
FIG. 7 is a cross-sectional view illustrating the container mouth in enlargement.

Also, with the optical system 1 according to the invention, other parts than the most protruding part P can also be inspected. For example, as shown in FIG. 7, an inner part 99f that is a distance (e.g., 5 mm) below the opening 99c can be inspected, because the principal rays (indicated by the arrow in the drawing) are inclined relative to the optical axis 5 and the light is not shut off except at the most protruding part P, although the image obtained may be somewhat blurred and less accurate.

Moreover, according to this invention, because the principal rays for forming the optical image 12 are converged on the side of the bottom 99b relative to the mouth 99a of the container 99, even if the aperture 4 of the diaphragm plate 3 is small, the principal rays that are lost by light refraction at the bottom 99b of the container 99 caused by its shape or the like are compensated for by refraction of other angles of light, and therefore no image of the container bottom 99b of the container 99 appears in the optical image 12. Accordingly, even when there is only a small difference between the inside diameter of the mouth and the diameter of the bottom of the container, the principal rays that are lost by light refraction at the bottom 99b of the container 99 caused by its shape or the like are compensated for sufficiently by refraction of other angles of light, and there is no need of setting the diameter of the aperture 4 in the diaphragm plate 3 larger than the diameter of the bottom. That is, the mouth inspection device of the invention can be used for inspection of the container 99 with having a small bottom diameter, because such a container can also be placed on the diaphragm plate 3 during inspection.

Figure 8:
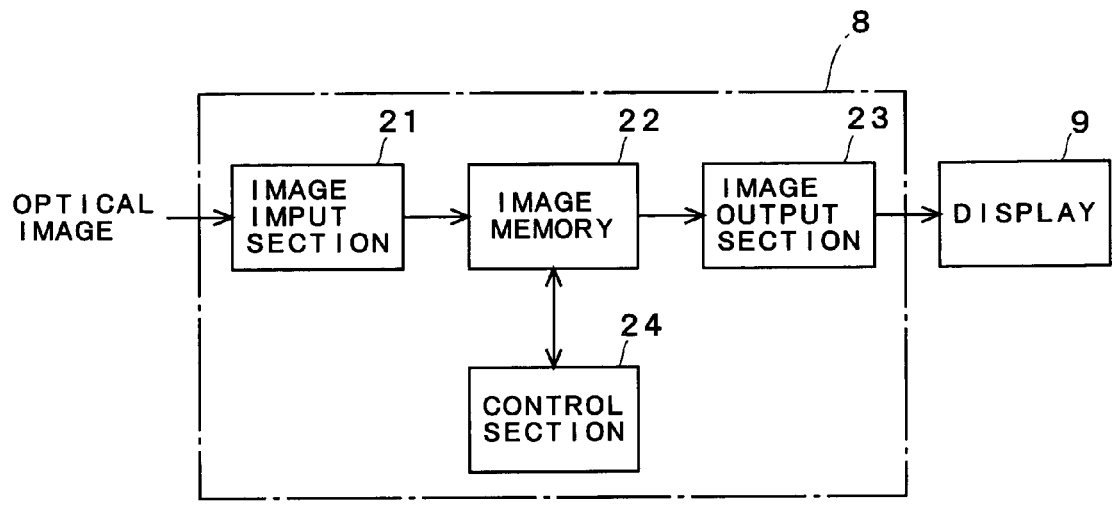
FIG. 8 is a block diagram illustrating the structure of an image processing device.

The image processing device 8 performs preset image processing of the input optical image 12 for the measurement of the inside diameter of the mouth 99a. It is made up of, as shown in FIG. 8, an image input section 21, an image memory 22, an image output section 23, and a control section 24, and the like.

The image input section 21 digitalizes the input gray scale image signals of the optical image 12, and binarizes the digital gray scale image data using a predetermined binary threshold to generate a binary image. The image memory 22 is for storing the gray scale image data and its binary image data. The image output section 23 converts the image data to analog and outputs the data to the display 9 for displaying the image.

The control section 24 extracts a largest inscribed circle 16 of an image region corresponding to the first dark part 14 of the binarized optical image 12 (see FIG. 5 and FIG. 6), and works out the diameter of the largest inscribed circle 16, which is determined as the inside diameter (effective diameter) r of the mouth 99a of the container 99. The control section 24 then compares the measured inside diameter r with an upper limit R1 and a lower limit R2 of the inside diameter of the mouth 99a. If the inside diameter r is not within the predetermined range, i.e., if r>R1 or r<R2, the control section decides that the container is defective.

Figure 9:
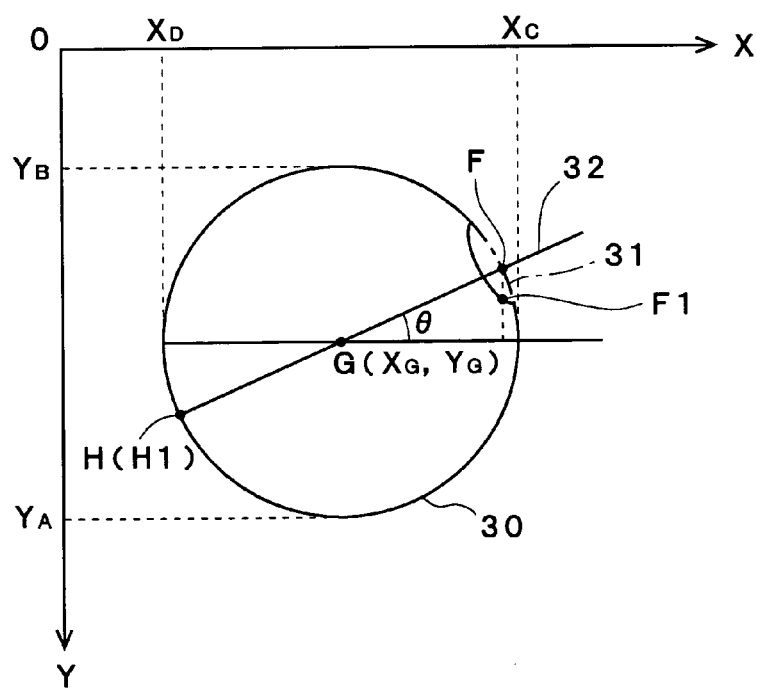
FIG. 9 is a diagram illustrating a method of measuring the inside diameter of the container mouth.
Figure 10:
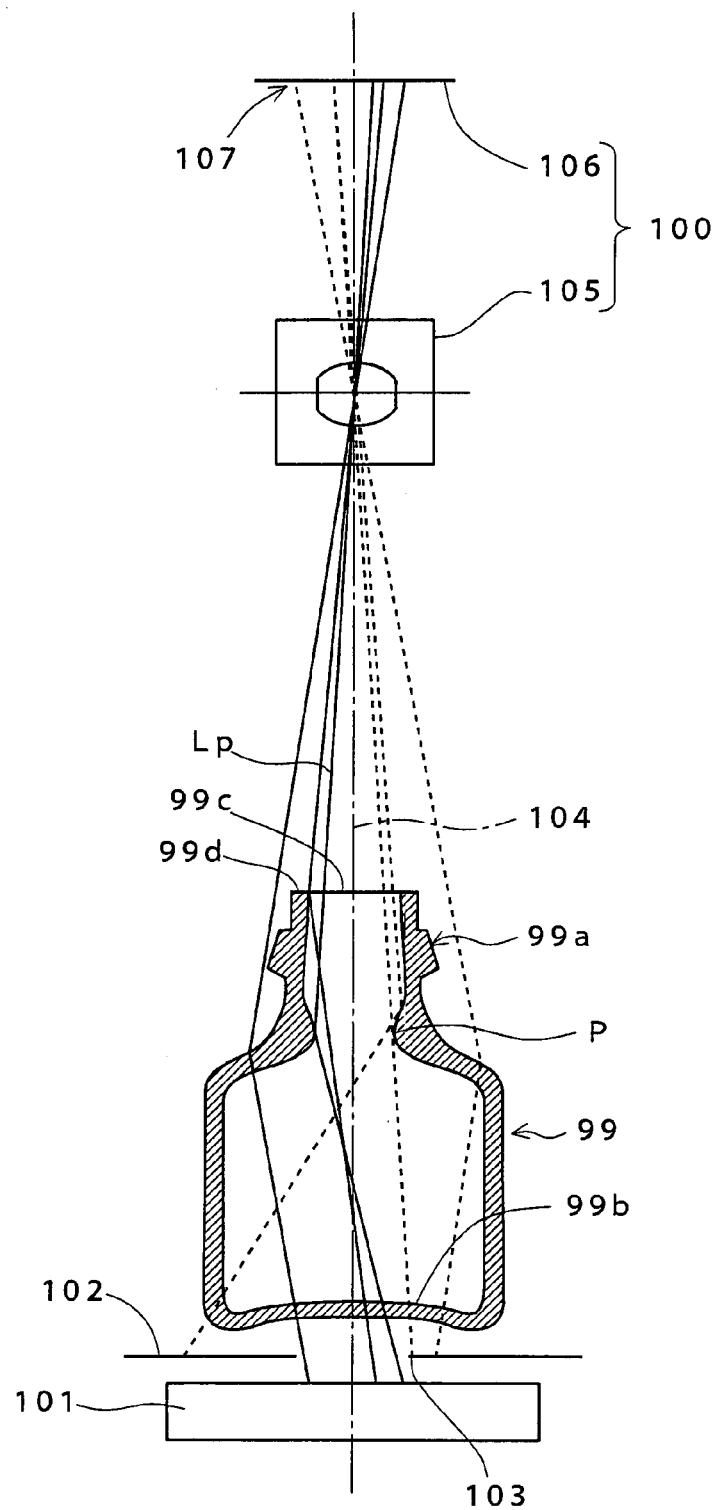
FIG. 10 is a diagram illustrating the structure of a common optical inspection device and light paths.
Figure 11:
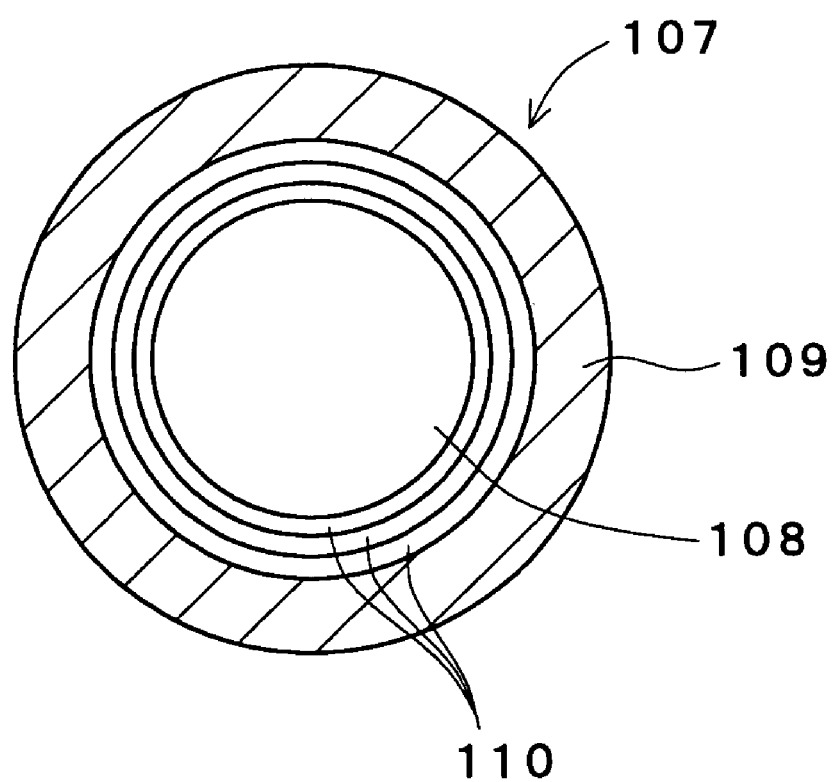
FIG. 11 is a diagram illustrating an optical image obtained by the device of FIG. 10.

FIG. 9 illustrates a specific example of the method of measuring the inside diameter r of the mouth 99a.

In the drawing, 30 represents the outline of the most protruding part in the inner surface of the mouth 99a, i.e., the annular boundary between the circular bright part 13 and the first dark part 14 in the optical image 12 (hereinafter referred to as "measured figure").

First, the minimum and maximum Y coordinates $Y_B$ and $Y_A$ and the minimum and maximum X coordinates $X_D$ and $X_C$ of the measured FIG. 30 in an XY coordinate system are determined. Then, assuming that the measured FIG. 30 is a true circle, the coordinates of the point of gravity G of the circle $(X_G, Y_G)$ are calculated out from the equations $X_G=(X_C+X_D)/2$ and $Y_G=(Y_A+Y_B)/2$.

Next, assuming that there is a circle 31 with a diameter of $(X_C-X_D)$ having the center coinciding with the center of gravity G, a line 32 is drawn with an inclination angle θ (e.g., 10°) passing the center of gravity G. Then, the X coordinates $X_F$, $X_H$ of the intersection points F, H of the line 32 and the imaginary circle 31 are calculated out from the following equations:

$$X_F = X_G + \frac{1}{2} \cdot (X_C - X_D) \cdot \cos\theta \quad (1)$$

$$X_H = X_G - \frac{1}{2} \cdot (X_C - X_D) \cdot \cos\theta \quad (2)$$

Next, points F1 and H1 forming the measured FIG. 30 and having the same X coordinates as the intersection points F and H are extracted. These points F1 and H1 are extracted by scanning a direction vertical to the X-axis from the intersection points F and H to find the boundary points of black pixels and white pixels. The coordinates $(X_F, Y_F)$ and $(X_H, Y_H)$ of the extracted points F1 and H1 are then input to the following equation (3) to obtain the distance $R_\theta$ between the points F1 and H1:

$$R_\theta = \sqrt{(X_F - X_H)^2 + (Y_F - Y_H)^2} \quad (3)$$

The distance $R_\theta$ is thus obtained using lines 32 with respective inclination angles θ at angular intervals of, for example, 10°, and the minimum value of the distance $R_\theta$ is determined as the diameter of the largest inscribed circle 16, i.e., the inside diameter r of the mouth 99a of the container 99. The value r is compared with an upper limit R1 and a lower limit R2 of the inside diameter of the mouth 99a and if it is not within the predetermined range, i.e., if r>R1 or r<R2, it is determined that the container is defective.

The maximum value of the distance $R_\theta$ may be obtained in addition to the minimum value, and this maximum value may be compared with a predetermined threshold to determine whether the container is good or not.

The above-described algorithm for measuring the inside diameter r of the mouth 99a of the container 99 is not a requirement, and the diameter r may be measured by other measurement methods using a different algorithm.

The invention claimed is:

1. A container mouth inspection device comprising: a light source for emitting diffused light to a bottom of a container having a mouth; and an optical system in which a lens and a diaphragm are arranged along an optical axis extending through the center of the container mouth, wherein
    the diaphragm is offset from a focus of the lens on a side of said lens opposed to said container along the optical axis by a predetermined additional distance from said container so as to form an optical image of the mouth in a position behind the diaphragm with respect to said container.

2. The container mouth inspection device according to claim 1, wherein
    the lens is arranged such that a most protruding position in the inner surface of the mouth is in focus.

3. The container mouth inspection device according to claim 1, wherein
    the diaphragm is movable along the optical axis for position adjustment.

4. The container mouth inspection device according to claim 1, further comprising an image processing device for performing image processing of the input optical image for measurement of an inside diameter of the mouth.

5. The container mouth inspection device according to claim 2, further comprising an image processing device for performing image processing of the input optical image for measurement of an inside diameter of the mouth.

6. The container mouth inspection device according to claim 3, further comprising an image processing device for performing image processing of the input optical image for measurement of an inside diameter of the mouth.

* * * * *